United States Patent
Ito et al.

(10) Patent No.: US 9,708,955 B2
(45) Date of Patent: Jul. 18, 2017

(54) EXHAUST PURIFYING DEVICE

(71) Applicant: Komatsu Ltd., Minato-ku, Tokyo (JP)

(72) Inventors: Akira Ito, Oyama (JP); Akihiro Miki, Oyama (JP); Takeo Oomori, Oyama (JP); Mitsuyoshi Kimura, Utsunomiya (JP)

(73) Assignee: Komatsu Ltd., Minato-ku, Tokyo (JP)

( * ) Notice: Subject to any disclaimer, the term of this patent is extended or adjusted under 35 U.S.C. 154(b) by 0 days.

(21) Appl. No.: 15/026,505

(22) PCT Filed: Nov. 25, 2015

(86) PCT No.: PCT/JP2015/083124
§ 371 (c)(1),
(2) Date: Mar. 31, 2016

(87) PCT Pub. No.: WO2016/068347
PCT Pub. Date: May 6, 2016

(65) Prior Publication Data
US 2017/0145885 A1    May 25, 2017

(51) Int. Cl.
*F01N 3/08*  (2006.01)
*F01N 3/28*  (2006.01)
*F01N 3/20*  (2006.01)
*F01N 3/10*  (2006.01)
(Continued)

(52) U.S. Cl.
CPC ............. *F01N 3/208* (2013.01); *F01N 3/106* (2013.01); *F01N 3/206* (2013.01); *F01N 3/36* (2013.01); *F01N 11/002* (2013.01); *F01N 2560/026* (2013.01); *F01N 2560/06* (2013.01); *F01N 2570/14* (2013.01); *F01N 2610/02* (2013.01);
(Continued)

(58) Field of Classification Search
CPC . F01N 3/08; F01N 3/10; F01N 3/2066; F01N 3/208; F01N 3/28; Y02T 10/24; Y02T 10/47
USPC .................... 60/286, 295, 299–301
See application file for complete search history.

(56) References Cited

U.S. PATENT DOCUMENTS

| | | | |
|---|---|---|---|
| 2011/0000194 A1* | 1/2011 | Gonze ..................... | F01N 3/027 60/286 |
| 2011/0139136 A1* | 6/2011 | Guo ..................... | F02D 41/0055 123/676 |
| 2011/0192143 A1* | 8/2011 | Andersson .............. | F01N 3/021 60/274 |

FOREIGN PATENT DOCUMENTS

| | | |
|---|---|---|
| JP | 2010-101237 | 5/2010 |
| JP | 2010-150979 | 7/2010 |
| JP | 2011-017250 | 1/2011 |

(Continued)

OTHER PUBLICATIONS

Written Opinion of the International Searching Authority in International Application No. PCT/JP2015/083124, mailed Mar. 1, 2016, 6 pages [With English Translation].

*Primary Examiner* — Mark A Laurenzi
*Assistant Examiner* — Dapinder Singh
(74) *Attorney, Agent, or Firm* — Fish & Richardson P.C.

(57) ABSTRACT

An exhaust purifying device includes a throttle valve, a DOC device, an SCR device, a fuel injector, an inlet temperature sensor, an outlet temperature sensor, and a controller. The controller includes a heatup-control execution control unit configured to perform a regeneration treatment for removing a urea deposit when a predetermined heatup control execution condition is met, and a condition (Continued)

judgment unit configured to judge whether or not the first condition is met during the regeneration treatment by the heatup control.

16 Claims, 9 Drawing Sheets

(51) Int. Cl.
    *F01N 3/36*     (2006.01)
    *F01N 11/00*     (2006.01)

(52) U.S. Cl.
    CPC   *F01N 2610/146* (2013.01); *F01N 2900/0422* (2013.01); *F01N 2900/1404* (2013.01)

(56) References Cited

FOREIGN PATENT DOCUMENTS

| | | |
|---|---|---|
| JP | 4986973 | 7/2012 |
| JP | 2013-124552 | 6/2013 |

\* cited by examiner

EXHAUST PURIFYING DEVICE

CROSS-REFERENCE TO RELATED APPLICATION

This application is a National Stage Application under 35 U.S.C. §371 and claims the benefit of International Application No. PCT/JP2015/083124, filed Nov. 25, 2015. The disclosure of the foregoing application is hereby incorporated by reference in its entirety.

TECHNICAL FIELD

The present invention relates to an exhaust purifying device that is configured to purify an exhaust gas of an engine.

BACKGROUND ART

Some of known exhaust purifying devices for purifying nitrogen oxides (NOx) contained in an exhaust gas of a diesel engine include a diesel oxidation catalyst disposed in an exhaust channel of the engine, an ammonia selective catalytic reduction device, a urea-aqueous-solution supply unit for supplying urea aqueous solution to the exhaust gas upstream of the ammonia selective catalytic reduction device, a deposit operation range judgment unit that judges whether an operation of the engine is in a deposit operation range in which urea deposit is deposited in the exhaust channel, a counter that counts the time in which the operation of the engine is in the deposit operation range, and a controller that executes a heatup control for raising the temperature of the exhaust gas in the exhaust channel to a target temperature when the counted time reaches a deposit limit judgment time (see, for instance, Patent Literature 1).

As disclosed in Patent Literature 1, the urea deposit is to be increased in accordance with the operation time of the engine. Accordingly, the controller of Patent Literature 1 supplies fuel into the exhaust channel when a time at which a predetermined amount of the urea deposit is presumably deposited is elapsed to cause a reaction of the fuel at the diesel oxidation catalyst to execute an exhaust heatup control, thereby gasifying and removing the urea deposit.

Further, Patent Literature 1 discloses that an operation status of the engine is judged based on the engine speed and the like per a control cycle, where, when the engine is in the operation status in which it is difficult to raise the temperature of the exhaust gas, the exhaust heatup control is not performed and when the engine is in the operation status capable of raising the temperature of the exhaust gas, the exhaust heatup control is performed.

CITATION LIST

Patent Literature(s)

Patent Literature 1 Publication of Japanese Patent No. 4986973

SUMMARY OF THE INVENTION

Problem(s) to be Solved by the Invention

However, whether or not the exhaust heatup control is performed depends on the operation status of the engine in Patent Literature 1. Accordingly, when, for instance, the operation is continued while the engine is in a low-load status, the engine may be continuously in the operation status in which the temperature of the exhaust gas is difficult to be raised, thus failing to efficiently remove the urea deposit. Accordingly, it has been demanded to appropriately judge whether or not the engine is in the operation status in which the urea deposit can be effectively removed.

An object of the invention is to provide an exhaust purifying device capable of appropriately judging whether the urea deposit can be effectively removed or not.

Means for Solving the Problem(s)

An exhaust purifying device according to an aspect of the invention includes: a throttle valve provided in a channel for an exhaust gas discharged from an engine to flow; a diesel oxidation catalyst device disposed downstream of the throttle valve; a selective catalytic reduction device disposed downstream of the diesel oxidation catalyst device; a fuel injector configured to inject a fuel at an upstream of the diesel oxidation catalyst device; an inlet temperature sensor configured to measure an inlet temperature of the diesel oxidation catalyst device; an outlet temperature sensor configured to measure an outlet temperature of the diesel oxidation catalyst device; and a controller that is configured to receive temperature data measured by the inlet temperature sensor and the outlet temperature sensor and is configured to control the throttle valve and the fuel injector, in which the controller includes: a heatup-control execution control unit configured to control the throttle valve and the fuel injector to raise a temperature of the injected fuel to perform a regeneration treatment by a heatup control to remove a urea deposit deposited in the channel when a predetermined heatup control execution condition is met; and a condition judgment unit configured to judge whether or not a first condition is met during the regeneration treatment by the heatup control, the first condition being met when a first cumulative time obtained by cumulating a time in which a measured temperature of the outlet temperature sensor is equal to or higher than a regeneration judgment temperature is less than a first judgment time and an elapsed time after starting the regeneration treatment by the heatup control reaches or exceeds a second judgment time.

According to the above aspect of the invention, the controller is configured to perform the regeneration treatment by the heatup control for removing the urea deposit in a working vehicle and the like installed with an engine while continuing an operation.

The controller judges whether or not the first condition is met using the condition judgment unit when the regeneration treatment by the heatup control is performed. The first condition is defined by obtaining the first cumulative time in which the measured temperature of the outlet temperature sensor is equal to or higher than the regeneration judgment temperature, whereby the time in which the regeneration treatment is performed is defined by the first cumulative time. Specifically, when the temperature of the outlet side of the diesel oxidation catalyst device is equal to or higher than the regeneration judgment temperature, it can be reliably judged that the regeneration treatment for removing the urea deposit deposited in the channel downstream of the diesel oxidation catalyst device is performed. Further, by setting the first judgment time as a time within which the regeneration treatment can be completed, it can be judged that the regeneration treatment by the heatup control is unfinished when the first cumulative time is less than the first judgment time. Further, when the time elapsed from the start of the heatup control reaches or exceeds the second judgment time while the regeneration treatment by the heatup control is unfinished, it can be judged that it is difficult to complete the regeneration treatment even when the heatup control is continued. Accordingly, the condition judgment unit can accurately determine that the regeneration treatment by the heatup control is difficult to be finished with reference to the judgment that the first condition is met.

An exhaust purifying device according to another aspect of the invention includes: a throttle valve provided in a channel for an exhaust gas discharged from an engine to flow; a diesel oxidation catalyst device disposed downstream of the throttle valve; a selective catalytic reduction device disposed downstream of the diesel oxidation catalyst device; a fuel injector configured to inject a fuel at an upstream of the diesel oxidation catalyst device; an inlet temperature sensor configured to measure an inlet temperature of the diesel oxidation catalyst device; an outlet temperature sensor configured to measure an outlet temperature of the diesel oxidation catalyst device; and a controller that is configured to receive temperature data measured by the inlet temperature sensor and the outlet temperature sensor and is configured to control the throttle valve and the fuel injector, in which the controller includes: a heatup-control execution control unit configured to control the throttle valve and the fuel injector to raise a temperature of the injected fuel to perform a regeneration treatment by a heatup control to remove a urea deposit deposited in the channel when a predetermined heatup control execution condition is met; and a condition judgment unit configured to judge whether or not a second condition is met during the regeneration treatment by the heatup control, the second condition being met when a first cumulative time obtained by cumulating a time in which a measured temperature of the outlet temperature sensor is equal to or higher than a regeneration judgment temperature is less than a first judgment time and a second cumulative time obtained by cumulating a time in which the measured temperature of the outlet temperature sensor is less than the regeneration judgment temperature reaches or exceeds a third judgment time.

According to the above aspect of the invention, the controller is configured to perform the regeneration treatment by the heatup control for removing the urea deposit in a working vehicle and the like installed with an engine while continuing an operation.

The controller judges whether or not the second condition is met using the condition judgment unit when the regeneration treatment by the heatup control is performed. The second condition is defined by obtaining the first cumulative time in which the measured temperature of the outlet temperature sensor is equal to or higher than the regeneration judgment temperature, whereby the time in which the regeneration treatment is performed is defined by the first cumulative time. Specifically, when the temperature of the outlet side of the diesel oxidation catalyst device is equal to or higher than the regeneration judgment temperature, it can be reliably judged that the regeneration treatment for removing the urea deposit deposited in the channel downstream of the diesel oxidation catalyst device is performed. Further, by setting the first judgment time as a time within which the regeneration treatment can be completed, it can be judged that the regeneration treatment by the heatup control is unfinished when the first cumulative time is less than the first judgment time. Further, when the second cumulative time in which the measured temperature of the outlet temperature sensor is less than the regeneration judgment temperature reaches or exceeds the third judgment time while the fuel is injected by the fuel injector, it can be judged that it is difficult to complete the regeneration treatment even when the heatup control is continued. Accordingly, the condition judgment unit can accurately determine that the regeneration treatment by the heatup control is difficult to be finished with reference to the judgment that the second condition is met.

An exhaust purifying device according to still another aspect of the invention includes: a throttle valve provided in a channel for an exhaust gas discharged from an engine to flow; a diesel oxidation catalyst device disposed downstream of the throttle valve; a selective catalytic reduction device disposed downstream of the diesel oxidation catalyst device; a fuel injector configured to inject a fuel at an upstream of the diesel oxidation catalyst device; an inlet temperature sensor configured to measure an inlet temperature of the diesel oxidation catalyst device; an outlet temperature sensor configured to measure an outlet temperature of the diesel oxidation catalyst device; and a controller that is configured to receive temperature data measured by the inlet temperature sensor and the outlet temperature sensor and is configured to control the throttle valve and the fuel injector, in which the controller includes: a heatup-control execution control unit configured to control the throttle valve and the fuel injector to raise a temperature of the injected fuel to perform a regeneration treatment by a heatup control to remove a urea deposit deposited in the channel when a predetermined heatup control execution condition is met; and a condition judgment unit configured to judge whether or not a first condition or a second condition is met during the regeneration treatment by the heatup control, the first condition being met when a first cumulative time obtained by cumulating a time in which a measured temperature of the outlet temperature sensor is equal to or higher than the regeneration judgment temperature is less than a first judgment time and an elapsed time from starting the regeneration treatment by the heatup control reaches or exceeds a second judgment time, the second condition being met when a first cumulative time obtained by cumulating a time in which a measured temperature of the outlet temperature sensor is equal to or higher than the regeneration judgment temperature is less than a first judgment time and a second cumulative time obtained by cumulating a time in which the measured temperature of the outlet temperature sensor is less than the regeneration judgment temperature reaches or exceeds a third judgment time.

According to the exhaust purifying device of the above aspect of the invention, the condition judgment unit can judge that the regeneration treatment by the heatup control is difficult to be finished with reference to the judgment that the first condition or the second condition is met. Further, when the condition judgment unit judges that the first condition or the second condition is met (i.e. that the regeneration treatment by the heatup control is difficult to be finished), the judgment result can be notified. Accordingly, when the urea deposit cannot be removed by the heatup control, the notification to the effect can be made on the notification device if one of the first condition and the second condition is met, whereby an operator can be notified of the necessity for the stationary manual regeneration treatment in various operation conditions.

In the exhaust purifying device according to the above aspect(s) of the invention, it is preferable that a judgment result of the condition judgment unit is notified when the condition judgment unit judges that at least one of the first and second conditions is met.

In the exhaust purifying device according to the above aspect(s) of the invention, it is preferable that the controller includes a stationary manual regeneration execution control unit that is configured to control the throttle valve and the fuel injector to raise the temperature of the injected fuel to perform a regeneration treatment by a stationary manual regeneration treatment to remove the urea deposit deposited in the channel upon detecting an execution operation for the regeneration treatment by an operator.

In the exhaust purifying device according to the above aspect(s) of the invention, it is preferable that the controller includes a stationary manual regeneration execution control unit that is configured to control the throttle valve and the fuel injector to raise the temperature of the injected fuel to perform a regeneration treatment by a stationary manual regeneration treatment to remove the urea deposit deposited in the channel upon detecting an execution operation for the regeneration treatment by an operator, and when the condition judgment unit judges that the first condition is met, the heatup-control execution control unit continues the regeneration treatment by the heatup control until the execution operation for the regeneration treatment by the operator is detected.

In the exhaust purifying device according to the above aspect(s) of the invention, it is preferable that, when the condition judgment unit judges that the second condition is met, the heatup-control execution control unit stops the regeneration treatment by the heatup control.

In the exhaust purifying device according to the above aspect(s) of the invention, it is preferable that the exhaust purifying device further includes a notification unit configured to notify an operator of a judgment result of the condition judgment unit, in which the controller includes a stationary manual regeneration execution control unit that is configured to control the throttle valve and the fuel injector to raise the temperature of the injected fuel to perform a regeneration treatment by a stationary manual regeneration treatment to remove the urea deposit deposited in the channel upon detecting an execution operation for the regeneration treatment by the operator; and a notification command unit that is configured to issue a first notification to the notification unit when the condition judgment unit judges that at least one of the first and second conditions is met, and the notification command unit issues a second notification to the notification unit when a fourth judgment time is elapsed without the regeneration treatment by the stationary manual regeneration treatment being commanded after the first notification is issued to the notification unit upon the judgment that the at least one of the first and second conditions is met.

BRIEF DESCRIPTION OF DRAWING(S)

FIG. 1 schematically illustrates a structure of a working vehicle provided with an exhaust purifying device according to an exemplary embodiment of the invention.

DESCRIPTION OF EMBODIMENT(S)

Figure 1:
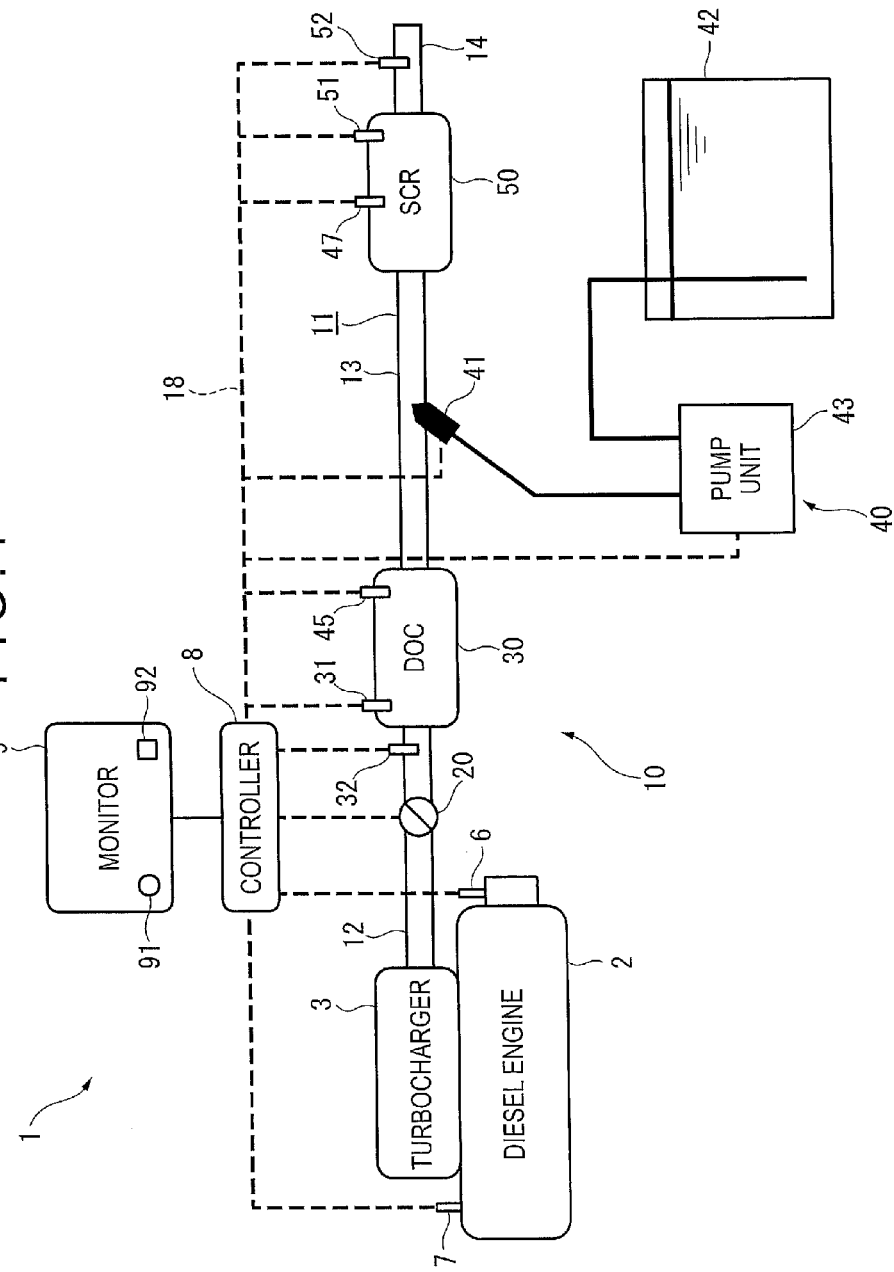

Exemplary embodiment(s) of the invention will be described below with reference to the attached drawings.
Outline of Exhaust Purifying Device FIG. 1 schematically illustrates a working vehicle 1 provided with an exhaust purifying device 10 according to an exemplary embodiment of the invention. The working vehicle 1 herein is exemplified by a machine configured to perform excavation and ground leveling, and transportation of sand and soil in mines, construction sites of a road and the like, which includes, for instance, construction machines such as a hydraulic excavator, a wheel loader, a bulldozer, a motor grader and crane and transporter vehicle such as a forklift. It should be noted that the exhaust purifying device 10 of the present exemplary embodiment is configured to purify an exhaust gas of a diesel engine and thus is applicable not only to the working vehicle 1 but also to various vehicles and machineries including a diesel engine.

The working vehicle 1 include a diesel engine 2, a turbocharger 3 having a turbine that is configured to be rotated by an exhaust gas of the diesel engine 2 to compress air to be supplied to the diesel engine 2, a controller 8, a monitor device 9, and the exhaust purifying device 10.

The diesel engine 2 includes an engine speed detector 6 configured to detect an engine speed, and a fuel injector 7 configured to inject fuel to the diesel engine 2. Detection data of the engine speed detector 6 is outputted to the controller 8. The controller 8 controls the fuel injector 7 in response to an operation on an accelerator and the like.
Monitor Device The monitor device 9 includes a display unit and an input unit. The display unit includes a liquid crystal display and the like.

Various information including cooling water temperature and residual fuel amount and caution information are displayed on the display unit. The monitor device 9 of the present exemplary embodiment includes a notification unit 91 for prompting an execution of the later-described stationary manual regeneration treatment. The monitor device 9 serves as a notification device for notifying an operator of the various information.

The input unit includes a switch (button) provided on a periphery of the display unit and the like. The function of the input unit(s) is displayed on the display unit using icon(s) and the like. Accordingly, an operator can easily recognize which one of the switches should be pressed in performing the stationary manual regeneration treatment. With a use of a touch-panel monitor device 9, an operator needs only to touch the switch(es) displayed on the touch panel. The monitor device 9 of the present exemplary embodiment includes a switch 92 for commanding the execution of the stationary manual regeneration treatment. It should be noted that the input unit is not necessarily the switch provided integrally with the monitor device 9, but the input unit may be provided in a form of a switch provided to a casing and the like independent of the monitor device 9.
Exhaust Purifying Device The exhaust purifying device 10 is configured to capture and reduce particulate matters (abbreviated as "PM" hereinafter) and residual matters such as NOx in the exhaust gas. The exhaust purifying device 10 is controlled by the controller 8.

The exhaust purifying device 10 includes a throttle valve 20, a diesel oxidation catalyst (abbreviated as "DOC" hereinafter) device 30, a urea-aqueous-solution injection system 40, and a selective catalytic reduction (referred to as "SCR" hereinafter) device 50 in an order from an upstream in a flow direction of the exhaust gas discharged by the diesel engine 2.

The DOC device 30, the urea-aqueous-solution injection system 40, and the SCR device 50 are provided in the channel 11 for the exhaust gas from the diesel engine 2 to be flowed. The channel 11 includes an inlet pipe 12 configured to introduce the exhaust gas from the turbocharger 3 connected to the diesel engine 2 into the DOC device 30, an outlet pipe 13 connecting the DOC device 30 and the SCR device 50, and an outlet pipe 14 connected to an outlet of the SCR device 50.

Throttle Valve

The throttle valve 20 includes a butterfly valve and the like disposed in the inlet pipe 12. The valve open degree of the throttle valve 20 is controlled by the controller 8. As described below, the valve open degree is adjusted to adjust the temperature of the exhaust gas. Specifically, when the valve open degree is reduced to increase a pressure resistance, the pressure inside the diesel engine 2 disposed upstream of the throttle valve 20 is also increased. When the pressure resistance is thus increased, the fuel injection quantity has to be increased in order to maintain the torque outputted by the diesel engine 2. When the fuel injection quantity is increased, combustion temperature is raised, so that the temperature of the exhaust gas can be raised. However, fuel efficiency is lowered due to the increased fuel injection quantity.

At this time, the controller 8 controls the valve open degree of the throttle valve 20 using a map data for setting the valve open degree in accordance with the fuel injection quantity and the engine speed. Specifically, when the fuel injection quantity is small (i.e. the load on the engine is small), the temperature of the exhaust gas is reduced. The temperature of the exhaust gas is also reduced when the engine speed is low. Supposing that the valve open degree of the throttle valve 20 is 100% when the throttle valve 20 is fully closed and 0% when the throttle valve 20 is fully opened, in a range where the fuel injection quantity is equal to or less than a predetermined amount, the valve open degree of the throttle valve 20 is set so as to be larger at a smaller fuel injection quantity (i.e. smaller at a larger fuel injection quantity) and to be larger at a lower engine speed (i.e. smaller at a higher engine speed). For instance, when the fuel injection quantity is small and the engine speed is low, the valve open degree is set approximately at 90%. When the fuel injection quantity becomes large and the engine speed is increased, the valve open degree is set small (e.g. approximately 60%). With the above arrangement, when the engine load is low (i.e. when the temperature is not easily raised), the valve is slightly closed (i.e. the valve open degree is increased) to raise the pressure resistance of the exhaust gas to raise the temperature of the exhaust gas.

DOC Device

The DOC device 30 includes a case. The diesel oxidation catalyst is housed in the case.

The DOC device 30 is a catalyst device configured to oxidize the fuel (referred to as a dosing fuel hereinafter) supplied into the exhaust gas as necessary to generate heat, thereby raising the temperature of the exhaust gas to a predetermined high temperature range. Using the temperature-raised exhaust gas, the urea deposit deposited inside the below-described outlet pipe 13 or the like is burned and removed to regenerate the catalyst device.

The dosing fuel is, for instance, light oil, which is the same as the engine fuel. In order to supply the dosing fuel into the engine cylinder, the dosing fuel is supplied using the fuel injector 7 which is configured to inject the fuel into the engine cylinder. Alternatively, a fuel injector for the dosing fuel may be provided to the inlet pipe 12 or the like to supply the dosing fuel in the exhaust gas and the dosing fuel may be flowed into the DOC device 30 together with the exhaust gas.

Urea-Aqueous-Solution Injection System

The urea-aqueous-solution injection system 40 adds the urea aqueous solution (aqueous reducing agent) in the exhaust gas. The urea-aqueous-solution injection system 40 includes an injection nozzle 41 attached to the outlet pipe 13 of the DOC device 30 and configured to inject the urea aqueous solution into the outlet pipe 13, a urea water tank 42 in which the urea aqueous solution is stored, and a pump unit 43 configured to supply the urea aqueous solution from the urea water tank 42 to the injection nozzle 41.

The controller 8 controls the injection nozzle 41 and the pump unit 43 to inject the urea aqueous solution from the injection nozzle 41 into the outlet pipe 13. The urea aqueous solution injected inside the outlet pipe 13 is hydrolyzed by the heat of the exhaust gas to ammonia.

SCR Device

The SCR device 50 reduces and purifies the nitrogen oxide in the exhaust gas using the ammonia obtained by the hydrolysis of the urea aqueous solution as the reducing agent. The reducing agent in the form of ammonia is supplied to the SCR device 50 together with the exhaust gas.

It should be noted that an ammonia-decreasing catalyst may be provided downstream of the SCR device 50. The ammonia-decreasing catalyst oxidizes the ammonia unused in the SCR device 50 to turn the ammonia into a harmless substance, thereby further reducing the emissions in the exhaust gas.

When the urea aqueous solution is injected from the injection nozzle 41, urea is sometimes crystallized in the outlet pipe 13 to be deposited. Accordingly, it is necessary to raise the temperature of the exhaust gas to decompose the deposits in the outlet pipe 13 (urea deposit) (regeneration treatment). The regeneration treatment includes a heatup control that is automatically performed while the working vehicle is in operation and a stationary manual regeneration treatment performed by a manual operation of an operator, which are switchably selected and controlled by the controller 8.

Sensor

The exhaust purifying device 10 includes various sensors configured to detect the status of the diesel engine 2 and the exhaust purifying device 10.

Specifically, a NOx sensor 32 configured to detect the concentration of the nitrogen oxide (NOx) contained in the exhaust gas is disposed at a part of the inlet pipe 12 downstream of the throttle valve 20. The DOC device 30 includes an inlet temperature sensor 31 configured to measure an inlet temperature of the DOC device 30, and an outlet temperature sensor 45 configured to measure an outlet temperature of the DOC device 30. The SCR device 50 is provided with an SCR internal temperature sensor 47 and an SCR outlet temperature sensor 51 configured to measure an outlet temperature of the SCR device 50.

An SCR outlet NOx sensor 52 configured to detect the concentration of the nitrogen oxide contained in the exhaust gas discharged by the SCR device 50 is disposed in the outlet pipe 14 connected to the SCR device 50.

These sensors are connected to the controller 8 via a Controller Area Network (CAN) 18 to output the measurement data to the controller 8.

The controller 8 measures the temperature of the exhaust gas at the inlet side of the DOC device 30 using the inlet temperature sensor 31 and controls the valve open degree of the throttle valve 20 in accordance with the measured temperature to adjust the temperature of the exhaust gas.

The controller 8 acquires an engine speed Ne from the engine speed detector 6, acquires an exhaust gas temperature Tatin at an inlet of the DOC device 30 from the inlet temperature sensor 31, and acquires nitrogen oxide concentration NOxin at the inlet of the DOC device 30 from the NOx sensor 32. Further, the controller 8 acquires an exhaust temperature Tatout at the outlet of the DOC device 30 from the outlet temperature sensor 45, acquires the temperature of the SCR catalyst from the SCR internal temperature sensor 47, acquires an SCR outlet temperature from the SCR outlet temperature sensor 51, and acquires a nitrogen oxide concentration NOxout at the outlet of the SCR device 50 from the SCR outlet NOx sensor 52.

The controller 8 controls the operations of the fuel injector 7, the throttle valve 20, the injection nozzle 41 and the pump unit 43 based on these acquired data, information on an operation on the accelerator by an operator and the like.

Controller

Next, the arrangement of the controller 8 will be described below.

Figure 2:
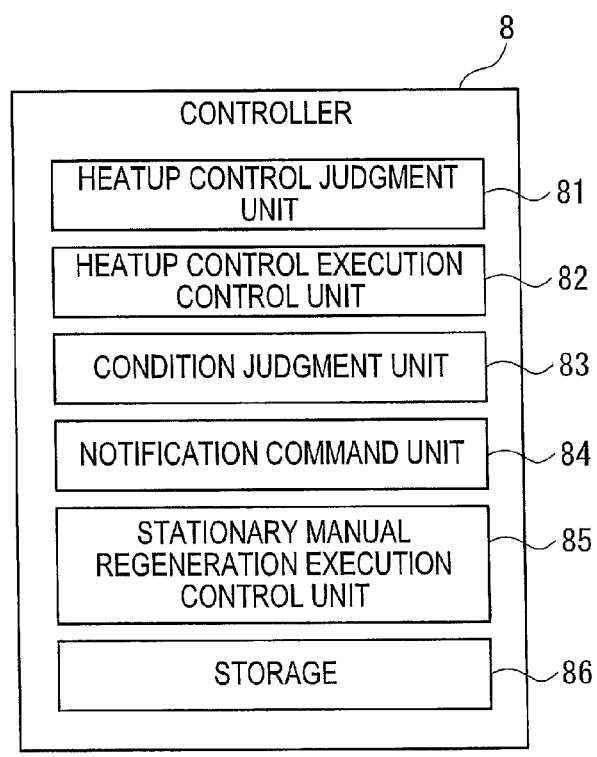
FIG. 2 is a block diagram showing an arrangement of a controller.

As shown in FIG. 2, the controller 8 includes a heatup-control judgment unit 81, a heatup-control execution control unit 82, a condition judgment unit 83, a notification command unit 84, a stationary manual regeneration execution control unit 85 and a storage 86.

Heatup-Control Judgment Unit

The heatup-control judgment unit 81 is configured to judge whether or not a heatup control execution condition for executing the heatup control is met. Specifically, the heatup-control judgment unit 81 judges that the heatup control execution condition is met when at least one of (A) the time elapsed after completion of the preceding regeneration operation reaches a first set time T1, and (B) a NOx removal efficiency calculated based on the measurement data of the NOx sensor 32 and the SCR outlet NOx sensor 52 is kept equal to or lower than a threshold for a second set time T2 or more.

The first set time T1 can be set in accordance with an estimated deposit amount of the urea deposit. Specifically, though the deposit amount of the urea deposit per an hour differs in accordance with the type of the working vehicle 1 and the diesel engine 2, details of work (operation status) and the like, the deposit amount of the urea deposit per an hour can be estimated by experiment(s) or simulation(s). The deposit amount of the urea deposit also affects a completion time of the heatup control. Accordingly, the first set time T1 can be set in consideration of the above. For instance, when the heatup control is set to be completed in a time period of 15 minutes and the time required for the urea deposit to reach an amount capable of being removed in the above time period differs depending on the type of the working vehicle (e.g. 36 hours, 48 hours, 72 hours, 96 hours), the first set time T1 may be set at 36 hours, 48 hours, 72 hours, 96 hours and the like depending on the type of the working vehicle. The first set time T1 is set in a range from about 36 to 96 hours in most of the working vehicles.

The NOx removal efficiency can be calculated by (Noxin−Noxout)/Noxin×100 with reference to the nitrogen oxide concentration NOxin measured by the NOx sensor 32 and the nitrogen oxide concentration NOxout measured by the SCR outlet NOx sensor 52.

It is only necessary for the second set time T2 to be capable of removing temporary fluctuations of the measurement data to reliably judge the decrease in the NOx removal efficiency. The second set time T2 can be set, for instance, in a range from about 1 to 10 minutes.

Heatup-Control Execution Control Unit

The heatup-control execution control unit 82 shown in FIG. 2 executes the heatup control when the heatup-control judgment unit 81 judges that the heatup control execution condition is met.

Accordingly, the heatup control is always performed for every first set time T1, and, even before the elapse of the first set time T1, the heatup control is performed if the NOx removal efficiency continues to be equal to or less than the threshold for the set time T2 or longer.

The heatup-control execution control unit 82 fetches a preset valve open degree ETVfft of the throttle valve 20 from the map configured to set the valve open degree at the execution of the heatup control and commands the preset valve open degree ETVfft to the throttle valve 20. For instance, the heatup-control execution control unit 82 fetches from the map the preset valve open degree ETVfft (e.g. 80%) specified by the engine speed Ne and a fuel injection quantity Qf and controls the throttle valve 20 so that the valve open degree of the throttle valve 20 becomes the preset valve open degree ETVfft.

Figure 3:
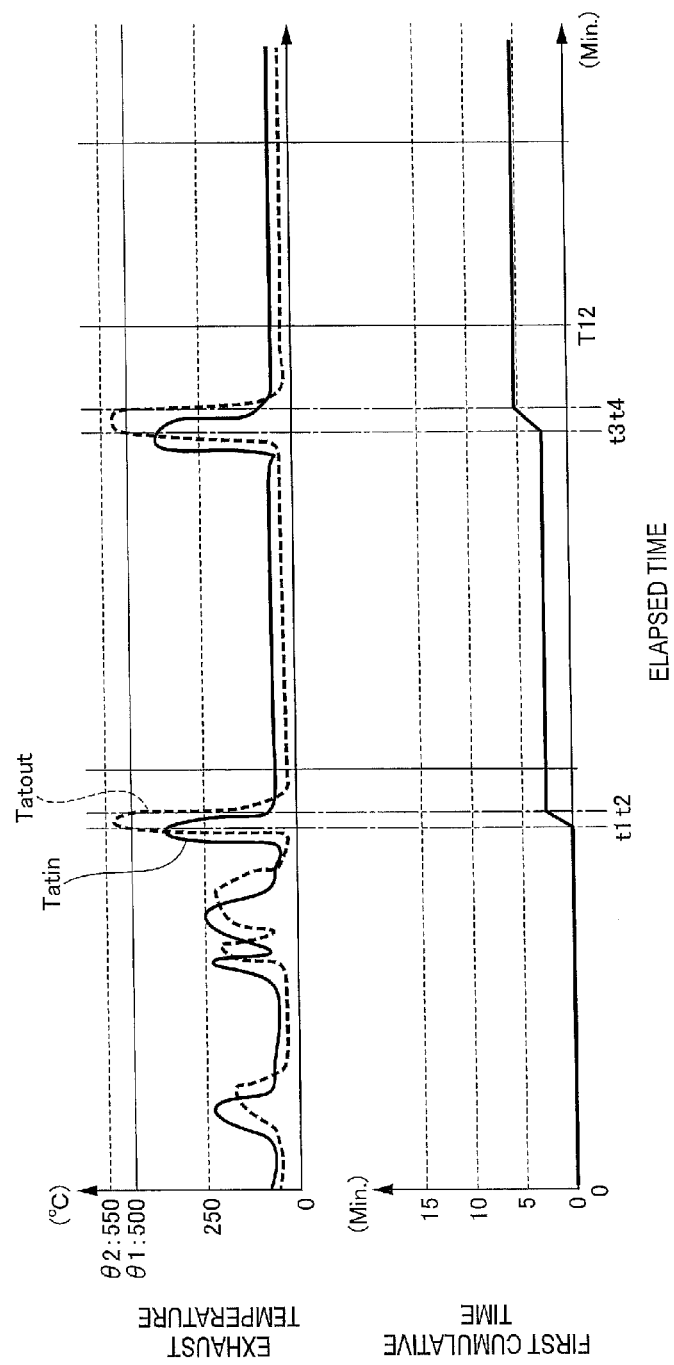
FIG. 3 is a graph showing a relationship between an elapsed time of a heatup control, a first cumulative time and an exhaust temperature in an instance meeting a first condition.

After the heatup-control execution control unit 82 commands to set the valve open degree of the throttle valve 20 at the preset valve open degree ETVfft, the heatup-control execution control unit 82 controls the fuel injector 7 to supply the dosing fuel when the inlet temperature Tatin measured by the inlet temperature sensor 31 reaches the preset temperature (e.g. 250 degrees C.) or more as shown in FIG. 3.

At this time, the dosing fuel is supplied at the timing at which the exhaust gas is discharged from the engine cylinder. Accordingly, the dosing fuel is supplied to the DOC device 30 together with the exhaust gas to cause a chemical reaction and generate heat at the oxidization catalyst in the DOC device 30. Thus, the temperature of the exhaust gas raised by the control of the valve open degree of the throttle valve 20 is further raised when the exhaust gas flows through the DOC device 30. In other words, the outlet temperature Tatout of the exhaust gas measured by the outlet temperature sensor 45 becomes further higher than the inlet temperature Tatin.

Accordingly, the urea deposit in the outlet pipe 13 can be removed and the device can be regenerated. As shown in FIG. 3, the heatup-control execution control unit 82 calculates a first cumulative time (regeneration time) by cumulating the time in which the outlet temperature Tatout measured by the outlet temperature sensor 45 is equal to or higher than the regeneration judgment temperature $\theta 1$ (e.g. 500 degrees C.) as shown in FIG. 3. The heatup-control execution control unit 82 judges that the heatup control is completed when the first cumulative time reaches or exceeds the first judgment time T11 (e.g. 15 minutes) and ends the heatup control.

The regeneration judgment temperature $\theta 1$ is set based on the regeneration target temperature $\theta 2$. The regeneration target temperature θ2 is a target value of the outlet temperature Tatout for removing the urea deposit. When it is found that the outlet temperature Tatout is lower than the regeneration target temperature θ2, the controller 8 mainly increases the supply amount of the dosing fuel to raise the outlet temperature Tatout. When the outlet temperature Tatout is higher than the regeneration target temperature θ2, the controller 8 mainly reduces the supply amount of the dosing fuel to lower the outlet temperature Tatout. Accordingly, during the regeneration treatment for removing the urea deposit, the outlet temperature Tatout fluctuates around the regeneration target temperature θ2. In order to judge whether or not the regeneration treatment in which the outlet temperature Tatout fluctuates around the regeneration target temperature θ2 is in progress, the regeneration judgment temperature θ1 that is lower than the regeneration target temperature θ2 by a predetermined temperature is defined. In the present exemplary embodiment, the regeneration target temperature θ2 is set at 550 degrees C., and the predetermined temperature is set at −50 degrees C. Accordingly, the regeneration judgment temperature θ1 is set at 500 degrees C. The regeneration judgment temperature θ1 is defined so as not to fall below the lower limit of the temperature range capable of removing the urea deposit.

The first judgment time T11 is set depending on the first set time T1. The first judgment time T11 is a time required for removing the urea deposit in the heatup control. Accordingly, the first judgment time T11 is dependent on the amount of the urea deposit. The amount of the urea deposit is influenced by the time period, in which the heatup control is performed (i.e. the first set time T1). Accordingly, the first judgment time T11 may be set depending on the first set time T1.

In the present exemplary embodiment, since the first set time T1 is 48 hours, and the first judgment time T11 is set at 15 minutes. When the first set time T1 is longer than 48 hours, it is preferable that the first judgment time T11 is set longer. When the first set time T1 is shorter than 48 hours, the first judgment time T11 can also be set shorter. Accordingly, the first judgment time T11 may be set within a range, for instance, approximately 10 to 60 minutes, depending on the first set time T1.

Condition Judgment Unit

The condition judgment unit 83 shown in FIG. 2 judges whether the regeneration treatment by the heatup control is not completed and the condition necessitating the stationary manual regeneration treatment are met or not. Specifically, the condition judgment unit 83 judges that the condition necessitating the stationary manual regeneration treatment are met when the first condition or the second condition is met during the regeneration treatment by the heatup control.

First Condition

The first condition is met when: the first cumulative time (regeneration time) cumulating the time period in which the measurement temperature (outlet temperature Tatout) of the outlet temperature sensor 45 during the regeneration treatment by the heatup control is equal to or higher than the regeneration judgment temperature θ1 is less than the first judgment time T11; and when the elapsed time after the start of the regeneration treatment is equal to or longer than a second judgment time T12 (e.g. 120 minutes). When the first condition is met, the condition judgment unit 83 judges that the execution condition for the stationary manual regeneration treatment is met.

As described above, the first judgment time T11 is a time required for completing the heatup control treatment.

The second judgment time T12 is set at a time allowing the continuation of the operation of the working vehicle 1 while the heatup control is performed. When the second judgment time T12 is elapsed while the heatup control is not completed, a notification that prompts the execution of the stationary manual regeneration treatment is issued. During the stationary manual regeneration treatment, the operation by the working vehicle 1 cannot be continued. Accordingly, as a grace period in which the operator can continue the operation until the notification is issued, the second judgment time T12 is defined. Accordingly, when the grace period may be set shorter, the second judgment time T12 may be shortened to, for instance, a time in a range from 60 to 90 minutes. On the other hand, when the grace period is desired to be set longer, the second judgment time T12 may be lengthened to, for instance, a range from 150 to 180 minutes.

Instances Meeting First Condition

For instance, as shown in FIG. 3, when the load on the diesel engine 2 is low while the heatup control is performed (e.g. the vehicle is stopped while idling), the temperature of the exhaust gas is low and the inlet temperature Tatin measured by the inlet temperature sensor 31 rarely exceeds the preset temperature (250 degrees C.). Accordingly, the supply of the dosing fuel conducted only when the inlet temperature Tatin is at or exceeds the preset temperature is scarcely performed, and the regeneration time in which the outlet temperature Tatout measured by the outlet temperature sensor 45 is equal to or higher than the regeneration judgment temperature θ1 is shortened. In FIG. 3, the outlet temperature Tatout is equal to or higher than the regeneration judgment temperature θ1 only in a section between the elapsed time t1 and elapsed time t2, and between the elapsed time t3 and elapsed time t4. Accordingly, if the elapsed time after the start of the regeneration treatment reaches the second judgment time T12 while the first cumulative time= (t2−t1)+(t4−t3) stays less than the first judgment time T11, the condition judgment unit 83 judges that the execution condition for the stationary manual regeneration treatment is met.

Second Condition

The second condition is met when: during the regeneration treatment by the heatup control and with the regeneration time being less than the first judgment time T11 (15 minutes), the second cumulative time cumulating the time in which the measurement temperature (outlet temperature Tatout) of the outlet temperature sensor 45 is less than the regeneration judgment temperature θ1 while the dosing fuel is kept supplied (i.e. the inlet temperature Tatin is equal to or higher than the preset temperature (250 degrees C.)) is equal to or less than a third judgment time T13 (e.g. 60 minutes). When the second condition is met, the condition judgment unit 83 also judges that the execution condition for the stationary manual regeneration treatment is met.

The third judgment time T13 is defined as a grace period for allowing the continuation of a status in which the temperature of the exhaust gas does not rise even though the dosing fuel is supplied and the regeneration treatment does not properly work. When the second condition is met, it is possible that the DOC device 30 does not properly work, or an operator performs a special operation for repeatedly switching the actuation and stop of the working vehicle in a short time. Accordingly, the judgment of meeting the second condition is preferably made within a time shorter than the second judgment time T12 for the first condition. Accordingly, the third judgment time T13 is set shorter than (specifically at a half of) the second judgment time T12. The time period for the third judgment time T13 may be adjusted in accordance with the second judgment time T12. For instance, when the second judgment time T12 is set at 90 minutes, the third judgment time T13 may be set at a time in a range of approximately 40 to 60 minutes. When the second judgment time T12 is set at 150 minutes, the third judgment time T13 may be set at a time in a range of approximately 60 to 80 minutes.

Instances Meeting the Second Condition

Figure 4:
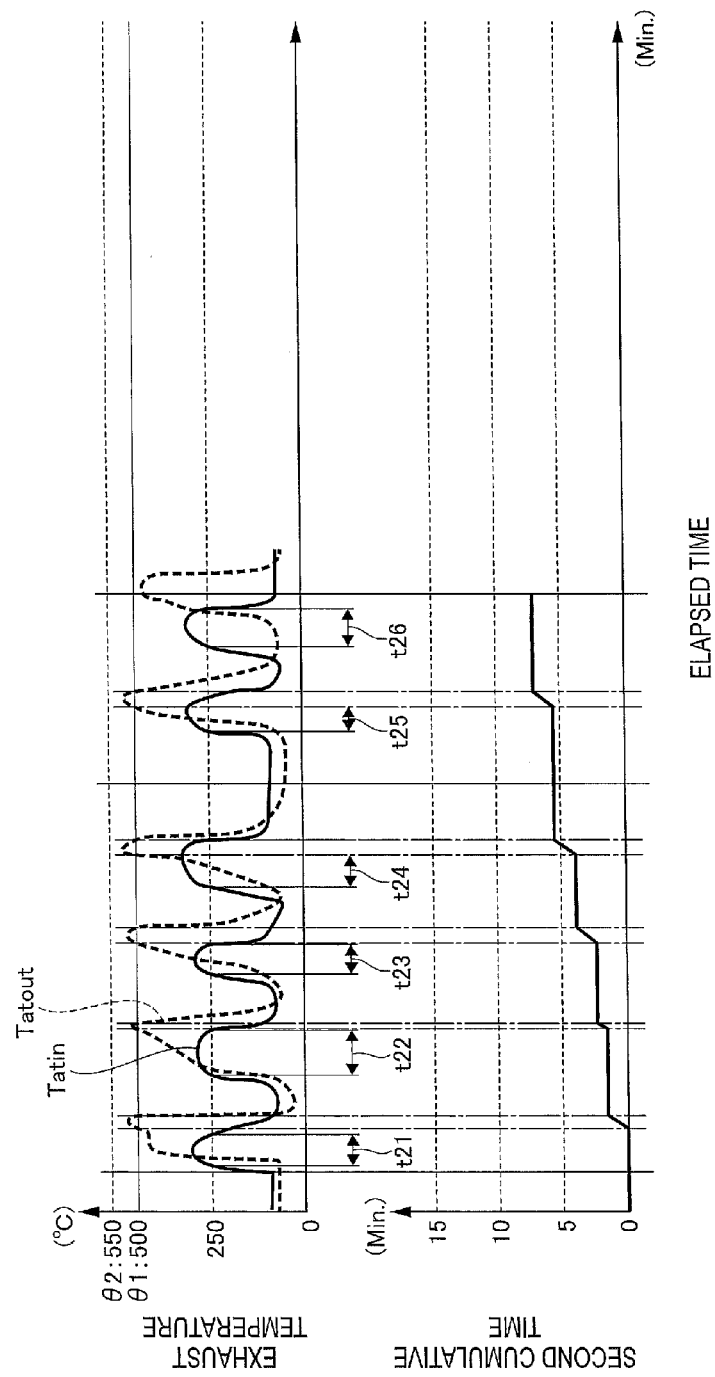
FIG. 4 is a graph showing a relationship between the elapsed time of the heatup control, the first cumulative time and the exhaust temperature in an instance meeting a second condition.

For instance, as shown in FIG. 4, while the heatup control is performed, depending on the usage of the working vehicle 1, it is possible that the measurement temperature (outlet temperature Tatout) of the outlet temperature sensor 45 does not exceed the regeneration judgment temperature θ1 and the second cumulative time in which the outlet temperature Tatout is less than the regeneration judgment temperature θ1 reaches or exceeds the third judgment time T13 even when the dosing fuel is supplied. The second cumulative time is a cumulative time of the time period indicated by arrows t21 to t26 in FIG. 4. It should be noted that the first cumulative time in FIG. 4 is, in the same manner as the first condition, the regeneration time in which the outlet temperature Tatout is equal to or higher than the regeneration judgment temperature θ1. When the second condition is met, the heatup control treatment does not end even after supplying the dosing fuel, so that it can be judged that the stationary manual regeneration treatment is necessary at an earlier stage than that of the judgment based on the first condition.

Notification Command Unit

The notification command unit 84 shown in FIG. 2 issues a notification signal A to the monitor device 9 (notification device) configured to notify an operator of the judgment result to command the notification of the judgment result when the condition judgment unit 83 judges that the first condition or the second condition is met while executing the heatup control. Upon receipt of the notification signal A, the monitor device 9 blinks the notification unit 91 or beeps a buzzer or the like to notify the operator that the first condition or the second condition is met. Based on the notification by the monitor device 9, the operator can understand that it is difficult to complete the regeneration treatment by the heatup control and the stationary manual regeneration treatment has to be performed.

When the operator presses the switch 92 on the monitor device 9 to command the execution of the stationary manual regeneration treatment in response to the notification by the monitor device 9, the stationary manual regeneration treatment is performed by the stationary manual regeneration execution control unit 85.

On the other hand, the notification command unit 84 issues a notification signal B (second control signal) when the operator does not command the execution of the stationary manual regeneration treatment within a fourth judgment time T14 (e.g. 30 minutes) after the issuance of the notification signal A. Upon receipt of the notification signal B, the monitor device 9 accelerates the blinking of the notification unit 91 or increases the volume of the buzzer or the like to again prompt the operator to execute the stationary manual regeneration treatment (second notification).

It should be noted that, if the condition judgment unit 83 judges that the first condition is met, the heatup-control execution control unit 82 continues the execution of the heatup control. Accordingly, the heatup control treatment continues after the notification is made by the notification command unit 84. Then, when the regeneration time reaches 15 minutes and the treatment by the heatup control is completed before the stationary manual regeneration treatment is actually performed, the notification command unit 84 stops the issuance of the notification signal A to terminate the notification by the monitor device 9. It should be noted that the controller 8 may issue a notification stop signal to the monitor device 9 to stop the notification by the monitor device 9.

On the other hand, if the condition judgment unit 83 judges that the second condition is met, the heatup-control execution control unit 82 stops the execution of the heatup control. Thus, the notification made by the notification command unit 84 continues unless the operator commands the execution of the stationary manual regeneration treatment.

Stationary Manual Regeneration Execution Control Unit

When the operator commands execution of the stationary manual regeneration treatment on the monitor device 9, the treatment by the stationary manual regeneration execution control unit 85 shown in FIG. 2 is performed. The stationary manual regeneration execution control unit 85 checks whether or not the working vehicle 1 is capable of performing the stationary manual regeneration treatment. For instance, the stationary manual regeneration execution control unit 85 checks whether or not the working vehicle 1 is stopped and out of operation (e.g. parking brake is effected, accelerator is off (i.e. accelerator pedal is not pressed) and the working equipment lever is at a neutral position).

When it is found that the switch 92 of the monitor device 9 is turned on by the operator in the above state, the stationary manual regeneration execution control unit 85 performs the stationary manual regeneration treatment.

The stationary manual regeneration treatment is performed, for instance, as follows. The stationary manual regeneration execution control unit 85 fetches from the map for the stationary manual regeneration the preset valve open degree ETVffo specified by the engine speed Ne and a fuel injection quantity Qf and controls the throttle valve 20 so that the valve open degree of the throttle valve 20 becomes the preset valve open degree ETVffo. It should be noted that the target inlet temperature Tatto for the stationary manual regeneration treatment and the compensation gain Gaino may be fetched from a predetermined map, and the difference between the target inlet temperature Tatto and the measured inlet temperature Tatin may be multiplied by the compensation gain Gaino to calculate the valve open degree compensation value ETVfbo. The valve open degree compensation value ETVfbo may be added to the preset valve open degree ETVffo to set the valve open degree command value ETVcmd.

In the stationary manual regeneration treatment, since the valve open degree of the throttle valve 20 and the supply amount of the dosing fuel are controlled so as to more easily raise the temperature of the exhaust gas than that in the heatup control, the urea deposit incapable of being removed by the heatup control can be removed. The stationary manual regeneration treatment automatically ends, in the same manner as the heatup control, when the first cumulative time in which the outlet temperature Tatout becomes equal to or higher than the regeneration judgment temperature θ1 at least reaches the first judgment time T11.

Storage

The storage 86 shown in FIG. 2 is provided by a non-volatile memory such as an Erasable Programmable Read Only Memory (EPROM) in the present exemplary embodiment. However, various storage devices including a semiconductor storage device, a magnetic storage device and an optical storage device can be used for the storage 86. The storage 86 stores various parameters and map data for the regeneration control.

The map data stored in the storage 86 includes, for instance, the map data for setting the valve open degree of the throttle valve 20 during a normal operation, the map data for setting the valve open degree of the throttle valve 20 during the heatup control, and the map data for setting the valve open degree of the throttle valve 20 during the stationary manual regeneration treatment.

The parameters stored in the storage 86 include the first set time T1, the second set time T2, the first judgment time T11, the second judgment time T12, the third judgment time T13, and the fourth judgment time T14.

Regeneration Treatment Control

Figure 6:
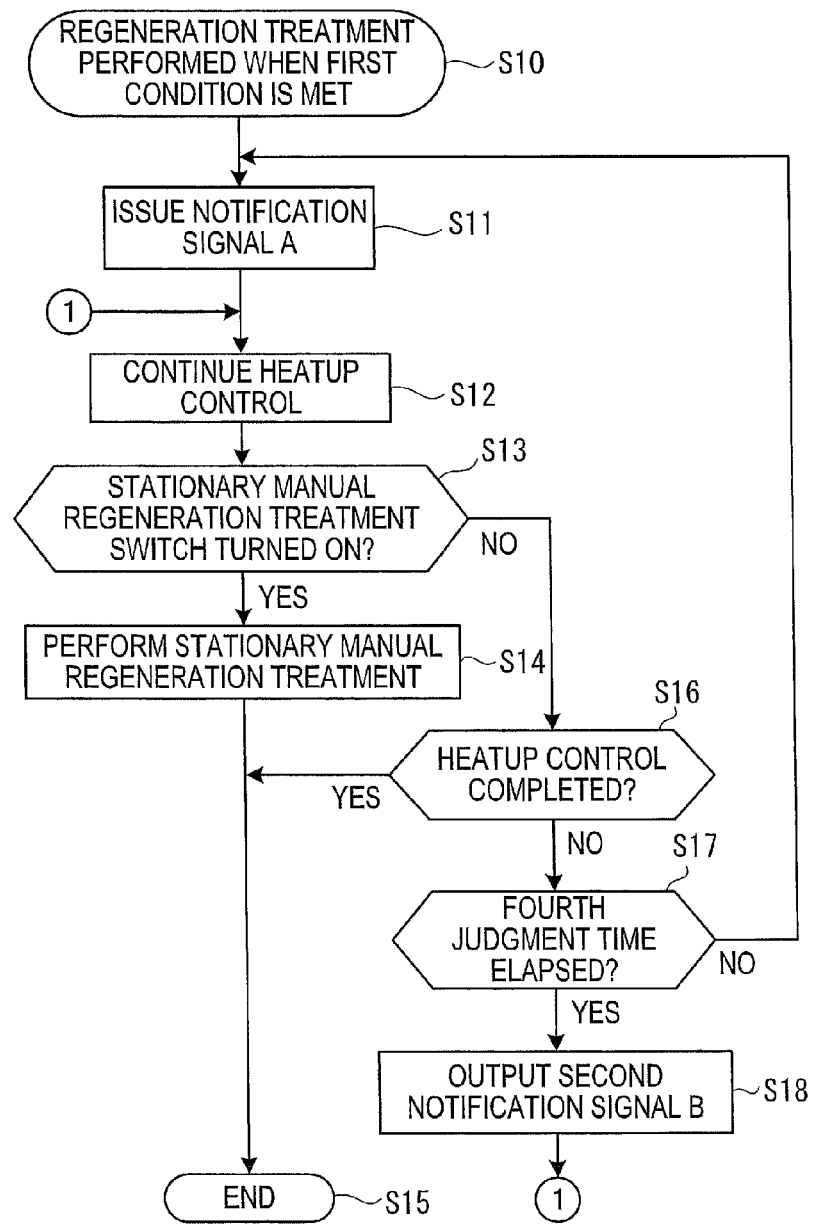
FIG. 6 is a flowchart showing a regeneration treatment control performed when the first condition is met.
Figure 7:
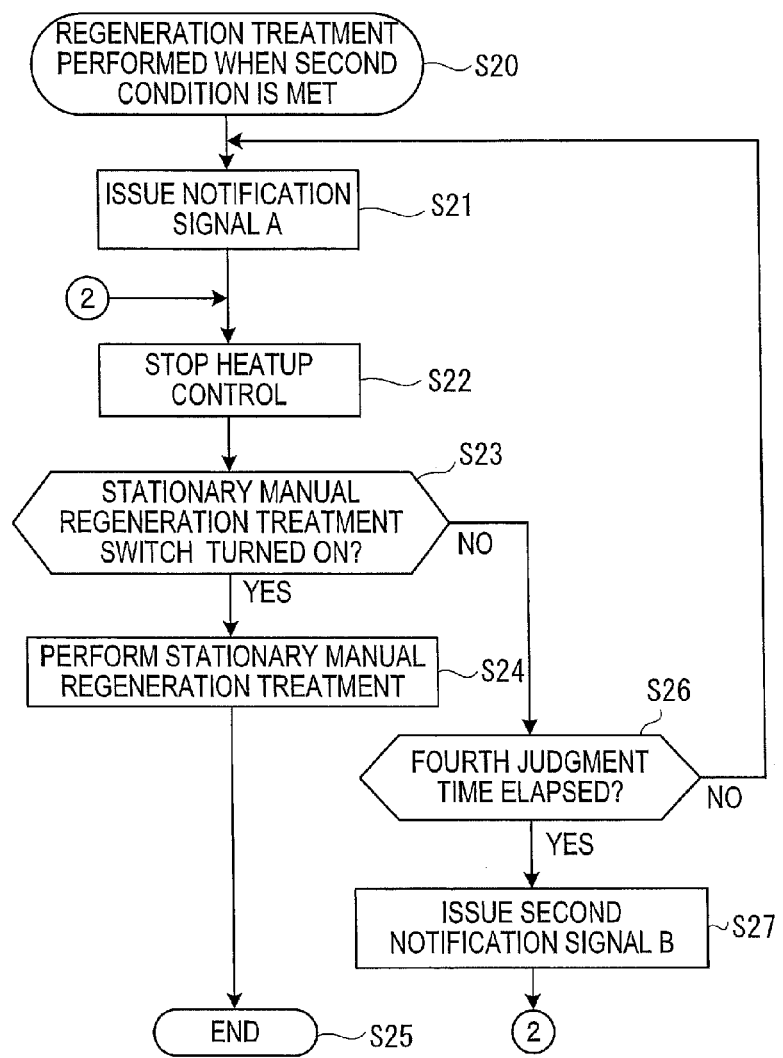
FIG. 7 is a flowchart showing a regeneration treatment control performed when the second condition is met.

Next, the regeneration treatment control by the controller 8 will be described below with reference to flowcharts in FIGS. 5 to 7.

Figure 5:
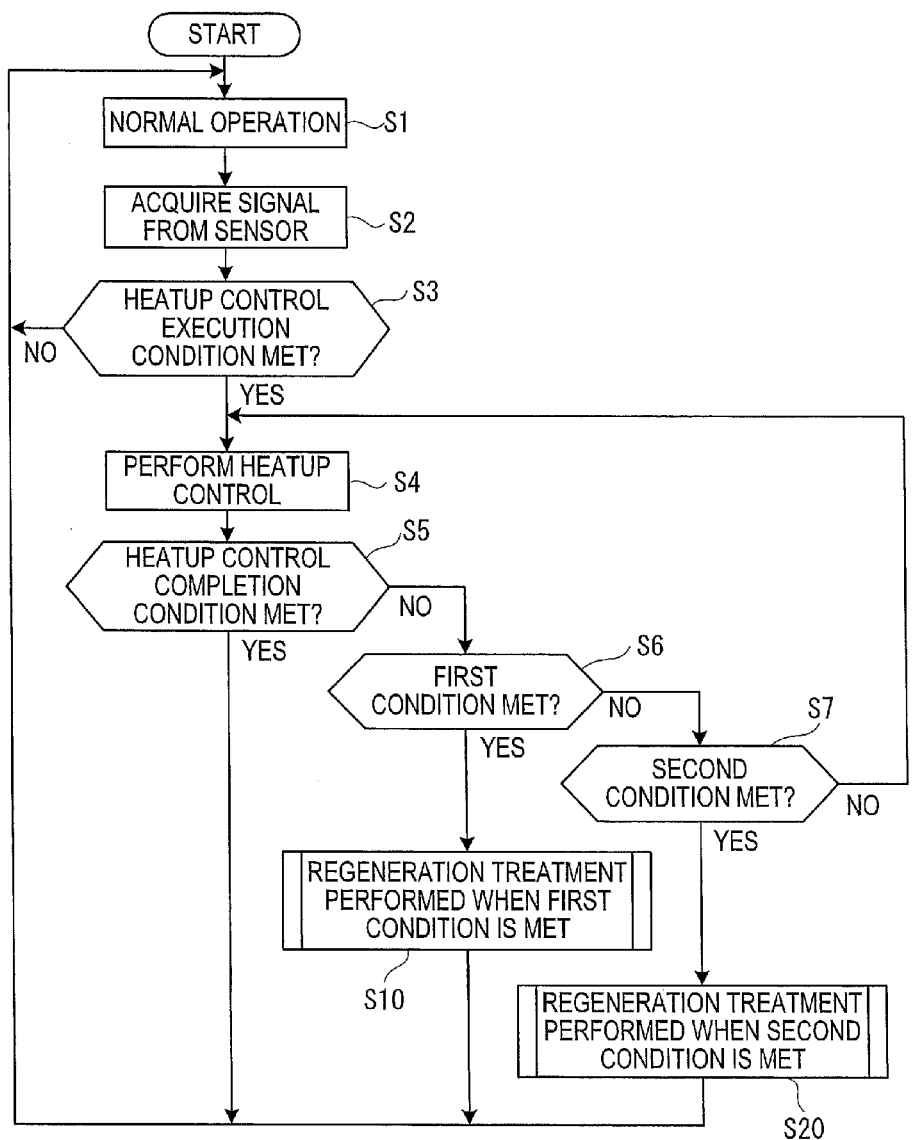
FIG. 5 is a flowchart showing a regeneration treatment control by the controller.

As shown in FIG. 5, while the working vehicle 1 is in operation, the controller 8 performs a normal work operation (Step S1). In this case, the controller 8 fetches the valve open degree from the map data for the normal operation to control the throttle valve 20. Further, the controller 8 receives signals from the sensors including the engine speed detector 6, the NOx sensor 32, the inlet temperature sensor 31, the outlet temperature sensor 45, the SCR internal temperature sensor 47, the SCR outlet temperature sensor 51, and the SCR outlet NOx sensor 52 (Step S2).

Then, the heatup-control judgment unit 81 of the controller 8 judges whether or not the heatup control execution condition is met (Step S3). As described above, the heatup-control judgment unit 81 judges that the heatup control execution condition is met when: the first set time T1 is elapsed after the completion of the preceding regeneration treatment, and; when the NOx removal efficiency keeps to be equal to or less than a predetermined value for the second set time T2 before the first set time T1 is elapsed.

When the judgment result by the controller 8 in Step S3 is "NO", the controller 8 continues the processes in Steps S1 and S2 until the heatup control execution condition is met.

When the judgment result by the controller 8 in Step S3 is "YES", the controller 8 performs the heatup control using the heatup-control execution control unit 82 (Step S4).

After the heatup control in Step S4, the controller 8 judges whether or not a heatup control completion condition is met (Step S5). As described above, the heatup control completion condition is met when the first cumulative time (regeneration time) cumulating the time in which the outlet temperature Tatout is equal to or higher than the regeneration judgment temperature θ1 is equal to or longer than the first judgment time T11.

When the judgment result by the controller 8 in Step S5 is "YES", the procedure is returned to Step S1 to continue the procedure.

On the other hand, when the judgment result is "NO" in Step S5, the condition judgment unit 83 of the controller 8 judges whether or not the first condition is met (Step S6). When the judgment result in Step S6 is "NO", the condition judgment unit 83 judges whether or not the second condition is met (Step S7).

When the judgment result in Step S6 is "YES", the controller 8 performs the regeneration treatment performed when the first condition is met (Step S10).

Further, when the judgment result in Step S6 is "YES", the controller 8 performs the regeneration treatment performed when the second condition is met (Step S20).

Further, when the judgment result in Step S7 is "NO", in other words, when none of the first condition and the second condition is met, the procedure goes back to Step S4 to continue the heatup control.

Regeneration Treatment when Meeting First Condition

Next, the regeneration treatment control performed when the first condition is met in Step S10 will be described below with reference to the flowchart in FIG. 6.

When the processing in Step S10 is performed, the notification command unit 84 of the controller 8 outputs the notification signal A to the monitor device 9 (Step S11). In response thereto, the monitor device 9 blinks the notification unit 91 or beeps the buzzer to notify the operator of the necessity of the stationary manual regeneration treatment. It should be noted that the heatup control is continuously performed even when the notification signal A is issued (Step S12).

The controller 8 judges whether or not the operator turned on the switch 92 for the stationary manual regeneration treatment (Step S13).

When the judgment result by the controller 8 in Step S13 is "YES", the controller 8 performs the above-described stationary manual regeneration treatment using the stationary manual regeneration execution control unit 85 (Step S14). It should be noted that, though the controller 8 is configured to continue the issuance of the notification signal A for continuously calling for the attention of the operator when the stationary manual regeneration treatment in Step S14 is performed, the controller 8 may alternatively be configured to stop the issuance of the notification signal A.

When the stationary manual regeneration treatment performed when the first condition is met is ended (Step S15), the procedure is returned to Step S1 in FIG. 5 to continue the normal operation. It should be noted that when the notification signal A is kept issued even while the stationary manual regeneration treatment is performed, the issuance of the notification signal A is also stopped when the regeneration treatment is ended in Step S15.

When the judgment result by the controller 8 in Step S13 is "NO", the controller 8 judges whether or not the continuously performed heatup control is completed (Step S16).

When the first cumulative time is equal to or longer than 15 minutes and the heatup control is completed, the judgment result of the controller 8 is "YES" in Step S16, and the regeneration treatment performed when the first condition is met is ended (Step S15). In this case, before the operator turns on the switch 92, the issuance of the notification signal A is stopped when the heatup control is completed.

When the judgment result by the controller 8 in Step S16 is "NO", the controller 8 judges whether or not the elapsed time after the start of the regeneration treatment in Step S10 exceeds the fourth judgment time T14 (e.g. 30 minutes) (Step S17).

When the judgment result by the controller 8 in Step S17 is "NO", the procedure is returned to Step S11 to continue the issuance of the notification signal A.

Further, when the judgment result by the controller 8 in Step S17 is "YES", the controller 8 issues the second notification signal B using the notification command unit 84 to the monitor device 9 (Step S18). Upon receipt of the second notification signal B, the monitor device 9 accelerates the blinking of the notification unit 91 or increases the volume of the buzzer or the like to make more pressing notification to the operator.

Subsequently, the controller 8 continues the processes in Step S12 to S18. When the judgment result is "YES" in Step S13 and the stationary manual regeneration treatment in Step S14 is performed or when the judgment result is "YES" in Step S16, the regeneration treatment performed when the first condition is met is ended (Step S15), and the procedure is returned to Step S1 in FIG. 5.

Regeneration Treatment when Meeting Second Condition

Next, the regeneration treatment control performed when the second condition is met in Step S20 will be described below with reference to the flowchart in FIG. 7.

The controller 8 initially issues the notification signal A to the monitor device 9 (Step S21). Upon receipt of the notification signal A, the monitor device 9 blinks the notification unit 91 or beeps a buzzer or the like.

The controller 8 stops the heatup control when the notification signal A is issued (Step S22). The second condition is met when the outlet temperature Tatout does not exceed the regeneration judgment temperature due to a failure in the DOC device 30 or when the temperature of the exhaust gas is difficult to be raised due to some specific operation(s) by an operator. In this case, since it is expected that the regeneration treatment will not be completed even when the heatup control is continued, the heatup control is stopped.

The controller 8 judges whether or not the operator turned on the switch 92 for the stationary manual regeneration treatment (Step S23).

When the judgment result by the controller 8 in Step S23 is "YES", the controller 8 performs the above-described stationary manual regeneration treatment using the stationary manual regeneration execution control unit 85 (Step S24). It should be noted that, though the controller 8 is configured to continue the issuance of the notification signal A when the stationary manual regeneration treatment in Step S24 is performed, the controller 8 may alternatively be configured to stop the issuance of the notification signal A.

When the controller 8 finds that the regeneration treatment performed when the second condition is met is ended (Step S25), the procedure is returned to Step S1 in FIG. 5. It should be noted that when the notification signal A is kept issued even while the stationary manual regeneration treatment is performed, the issuance of the notification signal A is also stopped when the stationary manual regeneration treatment is ended in Step S25.

When the judgment result by the controller 8 in Step S23 is "NO", the controller 8 judges whether or not the elapsed time after the start of the regeneration treatment in Step S20 exceeds the fourth judgment time T14 (Step S26).

When the judgment result by the controller 8 in Step S26 is "NO", the procedure is returned to Step S1 to continue the notification.

Further, when the judgment result by the controller 8 in Step S26 is "YES", the controller 8 issues the second notification signal B to the monitor device 9 (Step S27). Upon receipt of the second notification signal B, the monitor device 9 accelerates the blinking of the notification unit 91 or increases the volume of the buzzer or the like to make more pressing notification to the operator.

Subsequently, the controller 8 continues the processes in Steps S22 to S27. When the judgment result is "YES" in Step S23 and the stationary manual regeneration treatment in Step S24 is performed, the regeneration treatment performed when the second condition is met is ended (Step S25), and the procedure is returned to Step S1 in FIG. 5.

ADVANTAGE(S) OF EXEMPLARY EMBODIMENT(S)

According to the exemplary embodiment, when the first condition or the second condition is met during the regeneration treatment by the heatup control, the notification prompting to perform the stationary manual regeneration treatment can be made. Accordingly, the operator can understand that the urea deposit cannot be removed even when the heatup control is continued, thus allowing the operator to perform the stationary manual regeneration treatment to effectively remove the urea deposit.

The first condition and the second condition are met when the first cumulative time in which the measured temperature of the outlet temperature sensor is equal to or higher than the regeneration judgment temperature is less than the first judgment time T11. Accordingly, it can be reliably determined that the heatup control is unfinished.

Further, the controller 8 judges that the first condition is met when the elapsed time after the start of the heatup control reaches or exceeds the second judgment time T12 while the heatup control is unfinished, so that an operator can operate the working vehicle at least for the second judgment time T12. Accordingly, the operator can continue his/her work before starting the stationary manual regeneration treatment that requires that the working vehicle is stopped, thereby restraining decrease in work efficiency.

Further, since the controller 8 judges that the second condition is met when the second cumulative time in which the measured temperature of the outlet temperature sensor 45 is less than the regeneration judgment temperature $\theta 1$ reaches or exceeds the third judgment time T13 while the heatup control stays unfinished and fuel is kept injected into the exhaust gas, it can be notified at an early stage that the regeneration treatment is difficult to be completed even when the heatup control is continued.

Further, since the notification is not made until the second cumulative time reaches or exceeds the third judgment time T13, the operator is allowed to operate the working vehicle until the second cumulative time reaches or exceeds the third judgment time T13.

Since the controller 8 continues the heatup control when the first condition is met, the heatup control may be finished to terminate the regeneration treatment before performing the stationary manual regeneration treatment. Accordingly, when, for instance, the first cumulative time is slightly shorter than the first judgment time T11 and the first condition is met, the stationary manual regeneration treatment becomes less necessary, thereby improving the work efficiency of the working vehicle 1.

Since the controller 8 terminates the heatup control when the second condition is met, useless fuel consumption due to the continued heatup control can be restrained when it is difficult to finish the heatup control.

Further, since the notification command unit 84 issues the second notification when the stationary manual regeneration treatment is not performed even after the fourth judgment time T14 is elapsed after the notification is made on the monitor device 9, the operator is reliably notified.

Incidentally, it should be understood that the scope of the present invention is not limited to the above-described exemplary embodiment(s) but includes modifications and improvements as long as the modifications and improvements are compatible with the invention.

Figure 8:
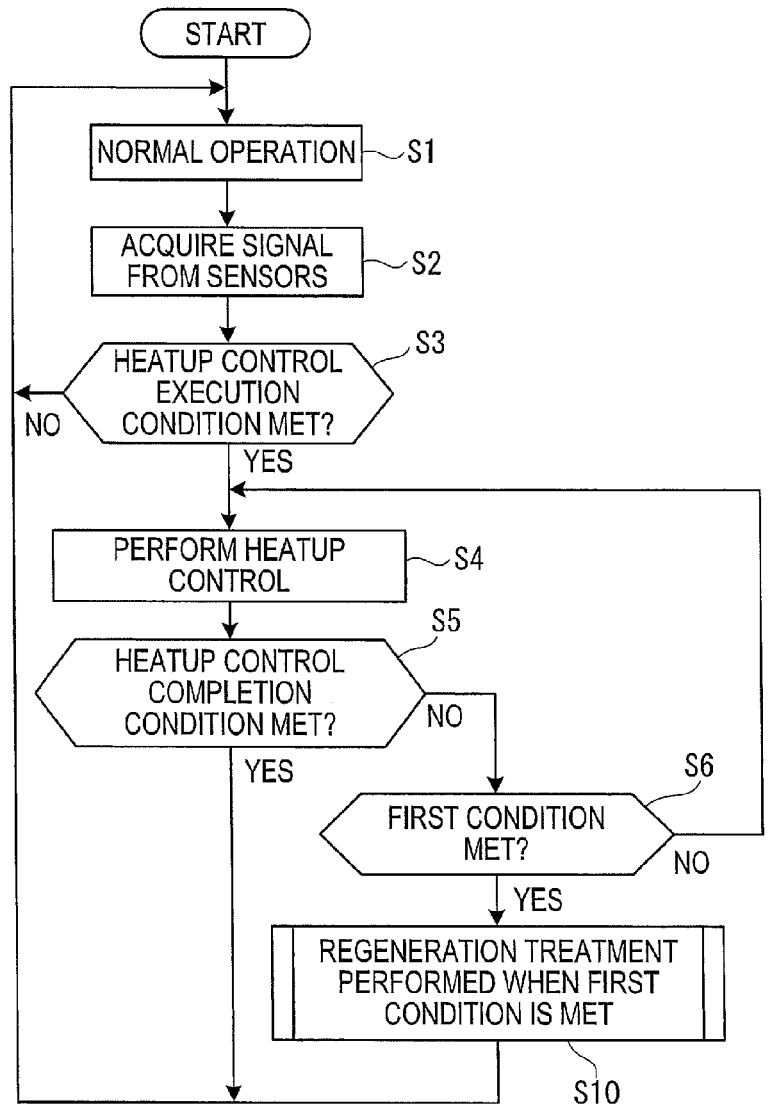
FIG. 8 is a flowchart showing a regeneration treatment control according to a modification of the invention.
Figure 9:
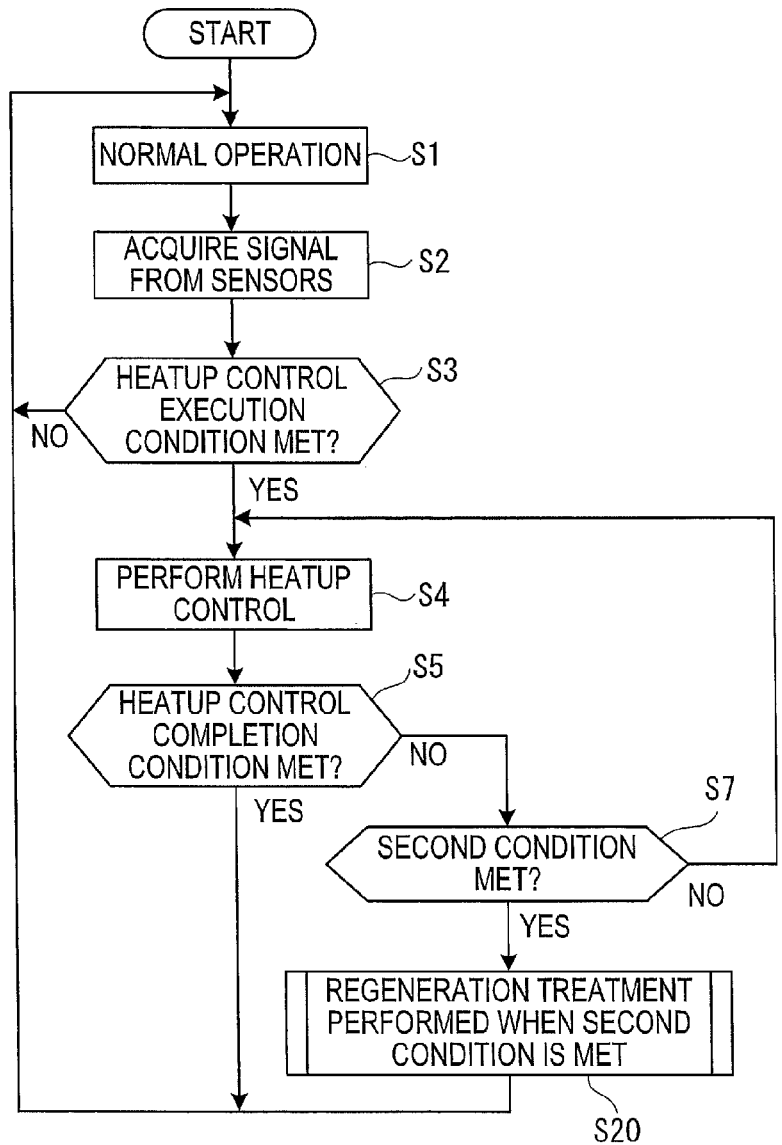
FIG. 9 is a flowchart showing a regeneration treatment control according to another modification of the invention.

For instance, though the judgment for switching the regeneration treatment by the heatup control to the stationary manual regeneration treatment is made based on the two conditions (i.e. the first condition and the second condition) in the first exemplary embodiment, the judgment may be made based solely on the first condition as shown in FIG. 8 or based solely on the second condition as shown in FIG. 9.

Further, the heatup control may be finished when the first condition is met in the same manner as the instance where the second condition is met.

Further, though the second notification signal B is issued when the stationary manual regeneration treatment is not performed after the elapse of the fourth judgment time T14 after the issuance of the first notification signal, such a process may be omitted.

The invention is applicable not only to construction machines such as hydraulic excavators, but is applicable to various working vehicles having an exhaust purifying device 10.

The invention claimed is:

1. An exhaust purifying device comprising:
   a throttle valve provided in a channel for an exhaust gas discharged from an engine to flow;
   a diesel oxidation catalyst device disposed downstream of the throttle valve;
   a selective catalytic reduction device disposed downstream of the diesel oxidation catalyst device;
   a fuel injector configured to inject a fuel at an upstream of the diesel oxidation catalyst device;
   an inlet temperature sensor configured to measure an inlet temperature of the diesel oxidation catalyst device;
   an outlet temperature sensor configured to measure an outlet temperature of the diesel oxidation catalyst device; and
   a controller that is configured to receive temperature data measured by the inlet temperature sensor and the outlet temperature sensor and is configured to control the throttle valve and the fuel injector, wherein
   the controller comprises:
   a heatup-control execution control unit configured to control the throttle valve and the fuel injector to raise a temperature of the injected fuel to perform a regeneration treatment by a heatup control to remove a urea deposit deposited in the channel when a predetermined heatup control execution condition is met; and
   a condition judgment unit configured to judge whether or not a first condition is met during the regeneration treatment by the heatup control, the first condition being met when a first cumulative time obtained by cumulating a time in which a measured temperature of the outlet temperature sensor is equal to or higher than a regeneration judgment temperature is less than a first judgment time and an elapsed time after starting the regeneration treatment by the heatup control reaches or exceeds a second judgment time.

2. An exhaust purifying device comprising:
   a throttle valve provided in a channel for an exhaust gas discharged from an engine to flow;
   a diesel oxidation catalyst device disposed downstream of the throttle valve;
   a selective catalytic reduction device disposed downstream of the diesel oxidation catalyst device;
   a fuel injector configured to inject a fuel at an upstream of the diesel oxidation catalyst device;
   an inlet temperature sensor configured to measure an inlet temperature of the diesel oxidation catalyst device;
   an outlet temperature sensor configured to measure an outlet temperature of the diesel oxidation catalyst device; and
   a controller that is configured to receive temperature data measured by the inlet temperature sensor and the outlet temperature sensor and is configured to control the throttle valve and the fuel injector, wherein
   the controller comprises:
   a heatup-control execution control unit configured to control the throttle valve and the fuel injector to raise a temperature of the injected fuel to perform a regeneration treatment by a heatup control to remove a urea deposit deposited in the channel when a predetermined heatup control execution condition is met; and
   a condition judgment unit configured to judge whether or not a second condition is met during the regeneration treatment by the heatup control, the second condition being met when a first cumulative time obtained by cumulating a time in which a measured temperature of the outlet temperature sensor is equal to or higher than a regeneration judgment temperature is less than a first judgment time and a second cumulative time obtained by cumulating a time in which the measured temperature of the outlet temperature sensor is less than the regeneration judgment temperature reaches or exceeds a third judgment time.

3. An exhaust purifying device comprising:
   a throttle valve provided in a channel for an exhaust gas discharged from an engine to flow;
   a diesel oxidation catalyst device disposed downstream of the throttle valve;
   a selective catalytic reduction device disposed downstream of the diesel oxidation catalyst device;
   a fuel injector configured to inject a fuel at an upstream of the diesel oxidation catalyst device;
   an inlet temperature sensor configured to measure an inlet temperature of the diesel oxidation catalyst device;
   an outlet temperature sensor configured to measure an outlet temperature of the diesel oxidation catalyst device; and
   a controller that is configured to receive temperature data measured by the inlet temperature sensor and the outlet temperature sensor and is configured to control the throttle valve and the fuel injector, wherein
   the controller comprises:
   a heatup-control execution control unit configured to control the throttle valve and the fuel injector to raise a temperature of the injected fuel to perform a regeneration treatment by a heatup control to remove a urea deposit deposited in the channel when a predetermined heatup control execution condition is met; and
   a condition judgment unit configured to judge whether or not a first condition or a second condition is met during the regeneration treatment by the heatup control, the first condition being met when a first cumulative time obtained by cumulating a time in which a measured temperature of the outlet temperature sensor is equal to or higher than a regeneration judgment temperature is less than a first judgment time and an elapsed time from starting the regeneration treatment by the heatup control reaches or exceeds a second judgment time, the second condition being met when a first cumulative time obtained by cumulating a time in which a measured temperature of the outlet temperature sensor is equal to or higher than the regeneration judgment temperature is less than a first judgment time and a second cumulative time obtained by cumulating a time in which the measured temperature of the outlet temperature sensor is less than the regeneration judgment temperature reaches or exceeds a third judgment time.

4. The exhaust purifying device according to claim 1, wherein
   a judgment result of the condition judgment unit is notified when the condition judgment unit judges that the first condition is met.

5. The exhaust purifying device according to claim 1, wherein
the controller comprises: a stationary manual regeneration execution control unit that is configured to control the throttle valve and the fuel injector to raise the temperature of the injected fuel to perform a regeneration treatment by a stationary manual regeneration treatment to remove the urea deposit deposited in the channel upon detecting an execution operation for the regeneration treatment by an operator.

6. The exhaust purifying device according to claim 1, wherein
the controller comprises: a stationary manual regeneration execution control unit that is configured to control the throttle valve and the fuel injector to raise the temperature of the injected fuel to perform a regeneration treatment by a stationary manual regeneration treatment to remove the urea deposit deposited in the channel upon detecting an execution operation for the regeneration treatment by an operator, and
when the condition judgment unit judges that the first condition is met, the heatup-control execution control unit continues the regeneration treatment by the heatup control until the execution operation for the regeneration treatment by the operator is detected.

7. The exhaust purifying device according to claim 2, wherein
when the condition judgment unit judges that the second condition is met, the heatup-control execution control unit stops the regeneration treatment by the heatup control.

8. The exhaust purifying device according to claim 1, further comprising a notification unit configured to notify an operator of a judgment result of the condition judgment unit, wherein
the controller comprises:
a stationary manual regeneration execution control unit that is configured to control the throttle valve and the fuel injector to raise the temperature of the injected fuel to perform a regeneration treatment by a stationary manual regeneration treatment to remove the urea deposit deposited in the channel upon detecting an execution operation for the regeneration treatment by the operator; and
a notification command unit that is configured to issue a first notification to the notification unit when the condition judgment unit judges that the first condition is met, and
the notification command unit issues a second notification to the notification unit when a fourth judgment time is elapsed without the regeneration treatment by the stationary manual regeneration treatment being commanded after the first notification is issued to the notification unit upon the judgment that the first condition is met.

9. The exhaust purifying device according to claim 2, wherein
a judgment result of the condition judgment unit is notified when the condition judgment unit judges that the second condition is met.

10. The exhaust purifying device according to claim 2, wherein
the controller comprises: a stationary manual regeneration execution control unit that is configured to control the throttle valve and the fuel injector to raise the temperature of the injected fuel to perform a regeneration treatment by a stationary manual regeneration treatment to remove the urea deposit deposited in the channel upon detecting an execution operation for the regeneration treatment by an operator.

11. The exhaust purifying device according to claim 2, further comprising a notification unit configured to notify an operator of a judgment result of the condition judgment unit, wherein
the controller comprises:
a stationary manual regeneration execution control unit that is configured to control the throttle valve and the fuel injector to raise the temperature of the injected fuel to perform a regeneration treatment by a stationary manual regeneration treatment to remove the urea deposit deposited in the channel upon detecting an execution operation for the regeneration treatment by the operator; and
a notification command unit that is configured to issue a first notification to the notification unit when the condition judgment unit judges that the second condition is met, and
the notification command unit issues a second notification to the notification unit when a fourth judgment time is elapsed without the regeneration treatment by the stationary manual regeneration treatment being commanded after the first notification is issued to the notification unit upon the judgment that the second condition is met.

12. The exhaust purifying device according to claim 3, wherein
a judgment result of the condition judgment unit is notified when the condition judgment unit judges that at least one of the first and second conditions is met.

13. The exhaust purifying device according to claim 3, wherein
the controller comprises: a stationary manual regeneration execution control unit that is configured to control the throttle valve and the fuel injector to raise the temperature of the injected fuel to perform a regeneration treatment by a stationary manual regeneration treatment to remove the urea deposit deposited in the channel upon detecting an execution operation for the regeneration treatment by an operator.

14. The exhaust purifying device according to claim 3, wherein
the controller comprises: a stationary manual regeneration execution control unit that is configured to control the throttle valve and the fuel injector to raise the temperature of the injected fuel to perform a regeneration treatment by a stationary manual regeneration treatment to remove the urea deposit deposited in the channel upon detecting an execution operation for the regeneration treatment by an operator, and
when the condition judgment unit judges that the first condition is met, the heatup-control execution control unit continues the regeneration treatment by the heatup control until the execution operation for the regeneration treatment by the operator is detected.

15. The exhaust purifying device according to claim 3, wherein
when the condition judgment unit judges that the second condition is met, the heatup-control execution control unit stops the regeneration treatment by the heatup control.

16. The exhaust purifying device according to claim 3, further comprising a notification unit configured to notify an operator of a judgment result of the condition judgment unit, wherein the controller comprises:
a stationary manual regeneration execution control unit that is configured to control the throttle valve and the fuel injector to raise the temperature of the injected fuel to perform a regeneration treatment by a stationary manual regeneration treatment to remove the urea deposit deposited in the channel upon detecting an execution operation for the regeneration treatment by the operator; and
a notification command unit that is configured to issue a first notification to the notification unit when the condition judgment unit judges that at least one of the first and second conditions is met, and
the notification command unit issues a second notification to the notification unit when a fourth judgment time is elapsed without the regeneration treatment by the stationary manual regeneration treatment being commanded after the first notification is issued to the notification unit upon the judgment that the at least one of the first and second conditions is met.

\* \* \* \* \*